US012331185B2

(12) United States Patent
Joe et al.

(10) Patent No.: US 12,331,185 B2
(45) Date of Patent: Jun. 17, 2025

(54) THERMOPLASTIC RESIN COMPOSITION AND MOLDED ARTICLE INCLUDING THE SAME

(71) Applicant: LG CHEM, LTD., Seoul (KR)

(72) Inventors: Wangrae Joe, Daejeon (KR); Daeun Sung, Daejeon (KR); Tae Hoon Kim, Daejeon (KR); Chun Ho Park, Daejeon (KR); Yong Hee An, Daejeon (KR); Jeongmin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 624 days.

(21) Appl. No.: 17/760,994

(22) PCT Filed: May 26, 2021

(86) PCT No.: PCT/KR2021/006523
§ 371 (c)(1),
(2) Date: Mar. 16, 2022

(87) PCT Pub. No.: WO2022/065625
PCT Pub. Date: Mar. 31, 2022

(65) Prior Publication Data
US 2022/0363888 A1 Nov. 17, 2022

(30) Foreign Application Priority Data

Sep. 22, 2020 (KR) .................. 10-2020-0122542
May 18, 2021 (KR) .................. 10-2021-0064033

(51) Int. Cl.
C08L 51/00 (2006.01)
B29C 48/00 (2019.01)
B29C 48/395 (2019.01)
C08L 25/12 (2006.01)
C08L 77/06 (2006.01)

(52) U.S. Cl.
CPC .......... *C08L 51/003* (2013.01); *B29C 48/022* (2019.02); *B29C 48/397* (2019.02); *C08L 25/12* (2013.01); *C08L 77/06* (2013.01); *B29C 2948/92704* (2019.02); *C08L 2201/08* (2013.01); *C08L 2205/025* (2013.01); *C08L 2205/035* (2013.01); *C08L 2205/18* (2013.01)

(58) Field of Classification Search
CPC .. C08L 51/003; C08L 51/04; C08L 2205/025; C08L 2205/035; C08F 265/04
See application file for complete search history.

(56) References Cited

U.S. PATENT DOCUMENTS

| | | | |
|---|---|---|---|
| 2013/0172485 A1 | 7/2013 | Jin et al. | |
| 2015/0119489 A1 | 4/2015 | Kim | |
| 2015/0119508 A1 | 4/2015 | Park et al. | |
| 2019/0382574 A1 | 12/2019 | An et al. | |
| 2020/0283614 A1 | 9/2020 | Kim et al. | |
| 2021/0108070 A1* | 4/2021 | Park | C08L 55/02 |
| 2021/0214544 A1* | 7/2021 | Park | C08L 33/12 |
| 2021/0238404 A1 | 8/2021 | Sung et al. | |
| 2022/0298347 A1* | 9/2022 | Ryu | C08L 33/12 |
| 2022/0332936 A1* | 10/2022 | Park | C08L 51/04 |
| 2022/0348758 A1* | 11/2022 | Taguchi | C08L 51/06 |
| 2022/0372268 A1* | 11/2022 | Sung | C08L 25/12 |
| 2024/0182694 A1* | 6/2024 | Park | C08L 77/02 |

FOREIGN PATENT DOCUMENTS

| | | | |
|---|---|---|---|
| CN | 109071912 A | 12/2018 | |
| CN | 114502635 A | 5/2022 | |
| EP | 3517557 A1 * | 7/2019 | ........... C08F 212/10 |
| EP | 4 015 576 A1 | 6/2022 | |
| KR | 10-2009-0095764 A | 9/2009 | |
| KR | 10-0962175 B1 | 6/2010 | |
| KR | 10-2012-0070717 A | 7/2012 | |
| KR | 10-2013-0075812 A | 7/2013 | |
| KR | 10-2015-0047991 A | 5/2015 | |

(Continued)

OTHER PUBLICATIONS

"Understanding the Dynamics of Polymer Extrusion: Simulation of Thermoplastics Processing with Planetary Roller Extruders" authored by Radwan et al. and published in Heliyon 10 (2024), e28729.*
Extended European Search Report issued in corresponding European Patent Application No. 21863089.5, dated Oct. 11, 2022.
Office Action issued Sep. 11, 2023 from corresponding Chinese Patent Application No. 202180005522.9.
International Search Report and Written Opinion issued in corresponding International Patent Application No. PCT/KR2021/006523, dated Aug. 26, 2021.
First Office Action issued in corresponding Japanese Patent Application No. 2022-518306, dated Feb. 13, 2023.

*Primary Examiner* — Marc S Zimmer
(74) *Attorney, Agent, or Firm* — Morgan, Lewis & Bockius LLP

(57) ABSTRACT

The present disclosure relates to a thermoplastic resin composition and a molded article including the same. The thermoplastic resin composition includes 10 to 70% by weight of a graft copolymer (A) including an acrylate-aromatic vinyl compound-vinyl cyanide compound graft copolymer (A-1) containing acrylate rubber having an average particle diameter of 50 to 150 nm and an acrylate-aromatic vinyl compound-vinyl cyanide compound graft copolymer (A-2) containing acrylate rubber having an average particle diameter of 300 to 600 nm; and 30 to 90% by weight of a non-grafted copolymer (B) including a high molecular weight aromatic vinyl compound-vinyl cyanide compound copolymer (B-1) having a weight average molecular weight of 160,000 to 200,000 g/mol and a low molecular weight aromatic vinyl compound-vinyl cyanide compound copolymer (B-2) having a weight average molecular weight of 80,000 g/mol or more and less than 160,000 g/mol.

16 Claims, 1 Drawing Sheet

(56) References Cited

FOREIGN PATENT DOCUMENTS

| | | |
|---|---|---|
| KR | 10-2015-0050372 A | 5/2015 |
| KR | 10-1534962 B1 | 7/2015 |
| KR | 10-2016-0057601 A | 5/2016 |
| KR | 10-2019-0065944 A | 6/2019 |
| KR | 10-2020-0049604 A | 5/2020 |
| KR | 10-2020-0089101 A | 7/2020 |
| WO | 2020/091370 A1 | 5/2020 |
| WO | WO 2022/019431 A1 * | 1/2022 |

\* cited by examiner

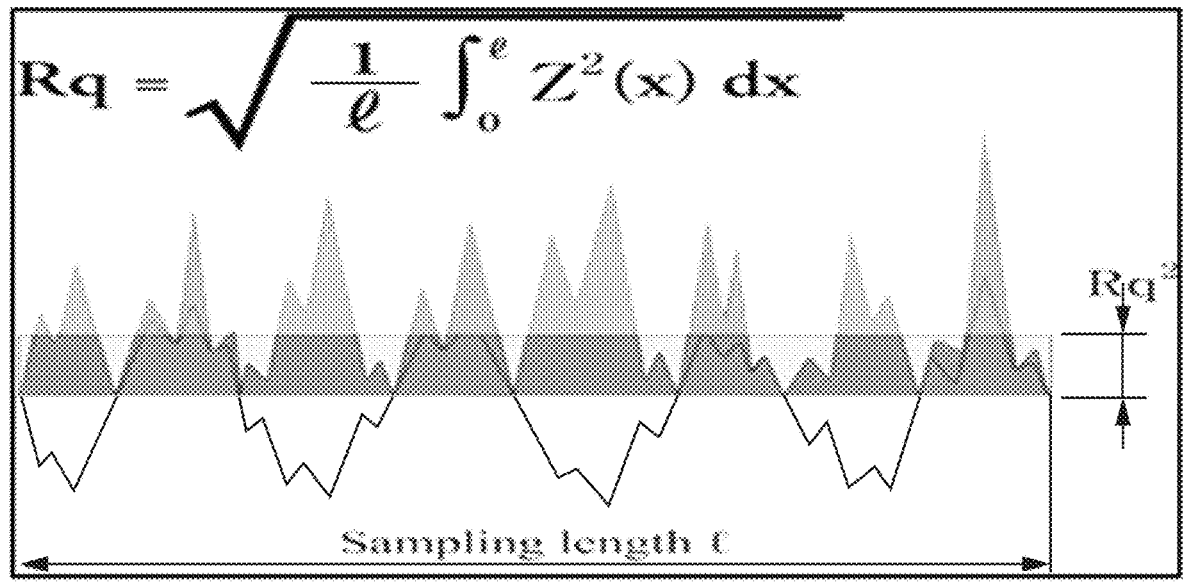
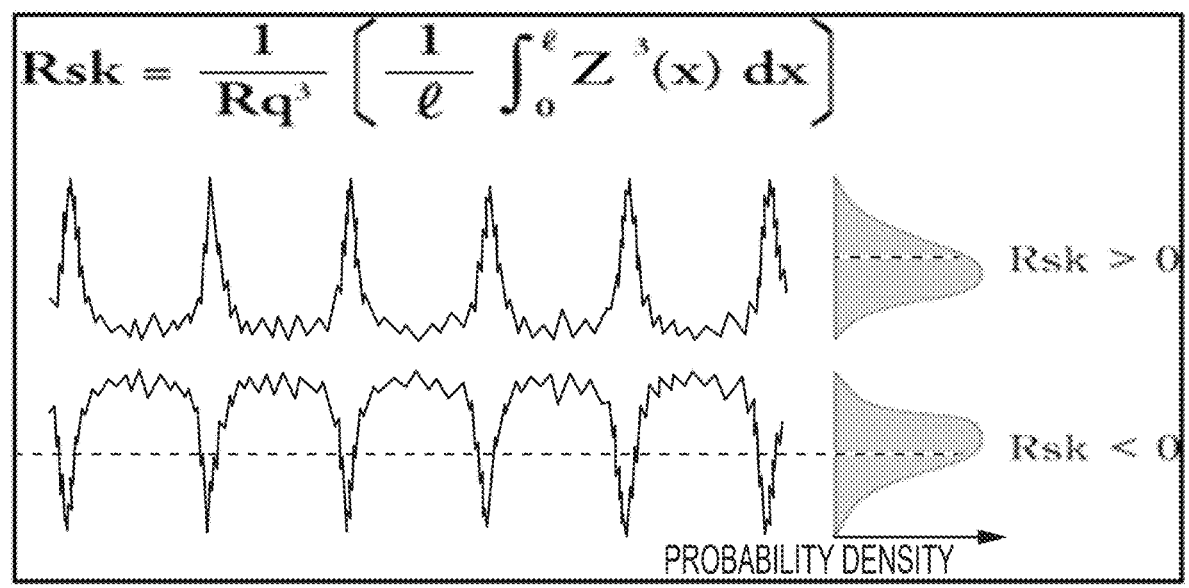

THERMOPLASTIC RESIN COMPOSITION AND MOLDED ARTICLE INCLUDING THE SAME

CROSS-REFERENCE TO RELATED APPLICATIONS

This application claims priority to Korean Patent Application No. 10-2020-0122542, filed on Sep. 22, 2020, and Korean Patent Application No. 10-2021-0064033, re-filed on May 18, 2021, based on the priority of the above patent, in the Korean Intellectual Property Office, the disclosures of each of which are incorporated herein by reference.

TECHNICAL FIELD

The present invention relates to a thermoplastic resin composition and a molded article including the same. More particularly, the present invention relates to a thermoplastic resin composition that has excellent processability at a low temperature of less than 200° C. compared to conventional ASA resins and thus has no surface defects, such as flow marks or peeling, during co-extrusion with a PVC resin; enables low energy consumption; has excellent processing stability due to a small change in viscosity even with a change in extrusion RPM; and has excellent heat resistance, and a molded article including the thermoplastic resin composition.

BACKGROUND ART

Acrylonitrile-styrene-acrylate copolymers (hereinafter referred to as "ASA resins") have good weather resistance, aging resistance, chemical resistance, rigidity, impact resistance, and processability, and are widely used in various fields such as automobiles, miscellaneous goods, and construction materials due to broad applicability thereof.

In particular, in the field of construction materials, ASA resins are widely used for PVC co-extrusion, and specific uses thereof include window profiles, deck boards, roofing, siding, and the like.

In the case of a conventional ASA resin, extrusion or injection processing is generally performed at a processing temperature of 200 to 240° C. On the other hand, in the case of a PVC resin, there is a limitation in that the PVC resin must be co-extruded at a low temperature of less than 200° C. due to the problem that the PVC resin is easily carbonized at a high temperature of 200° C. or higher. However, since the viscosity of an ASA resin rapidly increases at a low temperature of less than 200° C., a PVC resin layer is not properly covered with an ASA resin layer when the ASA resin is co-extruded with a PVC resin, causing surface defects such as generation of flow marks and peeling (not partially covered with the ASA resin). In addition, there is a disadvantage in that the viscosity of an ASA resin rapidly changes according to change in the RPM of an extruder, and a processing window is narrow.

Problems such as flow marks and peeling can be solved by increasing the temperature of an extruder die or an extruder barrel, or by increasing the extrusion RPM of an ASA resin to control shear heating of the ASA resin. However, when an extrusion temperature is increased, a large amount of energy is required. In addition, when the RPM of an ASA resin is increased, torque applied to an extruder is increased, thereby increasing a load applied to the machine.

Therefore, it is necessary to develop a resin that has no surface defects, such as flow marks or peeling, during co-extrusion with a PVC resin due to low viscosity even at low processing temperature, enables low energy consumption, and has excellent economics due to easy co-extrusion with a PVC resin.

RELATED ART DOCUMENTS

Patent Documents

KR 2009-0095764 A

DISCLOSURE

Technical Problem

Therefore, the present invention has been made in view of the above problems, and it is one object of the present invention to provide a thermoplastic resin composition that has excellent processability at a low temperature of less than 200° C. compared to conventional ASA resins and thus has no surface defects, such as flow marks or peeling, during co-extrusion with a PVC resin; enables low energy consumption; has excellent processing stability due to little change in viscosity despite a change in extrusion RPM; and has excellent heat resistance, and a molded article including the thermoplastic resin composition.

The above and other objects can be accomplished by the present invention described below.

Technical Solution

In accordance with one aspect of the present invention, provided is a thermoplastic resin composition including 10 to 70% by weight of a graft copolymer (A) including an acrylate-aromatic vinyl compound-vinyl cyanide compound graft copolymer (A-1) containing acrylate rubber having an average particle diameter of 50 to 150 nm and an acrylate-aromatic vinyl compound-vinyl cyanide compound graft copolymer (A-2) containing acrylate rubber having an average particle diameter of 300 to 600 nm; and 30 to 90% by weight of a non-grafted copolymer (B) including a high molecular weight aromatic vinyl compound-vinyl cyanide compound copolymer (B-1) having a weight average molecular weight of 160,000 to 200,000 g/mol and a low molecular weight aromatic vinyl compound-vinyl cyanide compound copolymer (B-2) having a weight average molecular weight of 80,000 g/mol or more and less than 160,000 g/mol, wherein, when extrusion RPM is changed from 20 to 60 under conditions of a barrel temperature of 190° C. and a die temperature of 200° C., a pressure gradient of the thermoplastic resin composition applied to a single screw extruder for sheet molding is 130 or less.

In accordance with another aspect of the present invention, provided is a thermoplastic resin composition including 10 to 70% by weight of a graft copolymer (A) including an acrylate-aromatic vinyl compound-vinyl cyanide compound graft copolymer (A-1) containing acrylate rubber having an average particle diameter of 50 to 150 nm and an acrylate-aromatic vinyl compound-vinyl cyanide compound graft copolymer (A-2) containing acrylate rubber having an average particle diameter of 300 to 600 nm; and 30 to 90% by weight of a non-grafted copolymer (B) including a high molecular weight aromatic vinyl compound-vinyl cyanide compound copolymer (B-1) having a weight average molecular weight of 160,000 to 200,000 g/mol and a low molecular weight aromatic vinyl compound-vinyl cyanide compound copolymer (B-2) having a weight average molecular weight of 80,000 g/mol or more and less than 160,000 g/mol, wherein, when the thermoplastic resin composition is discharged through a T-die for 1 minute and 30 seconds under conditions of a barrel temperature of 190° C., a die temperature of 200° C., and an extrusion RPM of 50, a discharge rate calculated based on a discharge amount of the thermoplastic resin composition is 18 g/min or more.

In accordance with still another aspect of the present invention, provided is a thermoplastic resin composition including 100 parts by weight of a base resin including 10 to 70% by weight of a graft copolymer (A) including an acrylate-aromatic vinyl compound-vinyl cyanide compound graft copolymer (A-1) containing acrylate rubber having an average particle diameter of 50 to 150 nm and an acrylate-aromatic vinyl compound-vinyl cyanide compound graft copolymer (A-2) containing acrylate rubber having an average particle diameter of 300 to 600 nm; and 30 to 90% by weight of a non-grafted copolymer (B) including a high molecular weight aromatic vinyl compound-vinyl cyanide compound copolymer (B-1) having a weight average molecular weight of 160,000 to 200,000 g/mol and a low molecular weight aromatic vinyl compound-vinyl cyanide compound copolymer (B-2) having a weight average molecular weight of 80,000 g/mol or more and less than 160,000 g/mol, 0.1 to 10 parts by weight of a polyamide resin, and 0.1 to 5 parts by weight of an inorganic pigment.

The thermoplastic resin composition may not include a thermoplastic resin having a glass transition temperature of 125° C. or higher.

In accordance with yet another aspect of the present invention, provided is a molded article including the thermoplastic resin composition of the present invention.

Advantageous Effects

The present invention can provide a thermoplastic resin composition that has excellent processability at a low temperature of less than 200° C. compared to conventional ASA resins and thus has no surface defects, such as flow marks or peeling, during co-extrusion with a PVC resin; enables low energy consumption; has excellent processing stability due to little change in viscosity even despite a change in extrusion RPM; and has excellent heat resistance, and a molded article including the thermoplastic resin composition.

DESCRIPTION OF DRAWINGS

FIG. 1 schematically shows the definition, calculation method, and meaning of skewness (Rsk) according to the present invention. The skewness (Rsk) is defined as a characteristic value representing the direction and degree of asymmetry with respect to an average value in the histogram of a statistical group, and through the skewness (Rsk), it is possible to evaluate which of peaks and valleys forms most of a surface. In particular, in the upper image of FIG. 1, an equation for obtaining a root mean square deviation (Rq) and a graph showing the meaning thereof are shown. Z denotes the height of a peak, and k denotes an average section length (sampling length). In addition, in the lower image of FIG. 1, an equation for obtaining skewness (Rsk) and a graph showing the meaning thereof are shown. As a skewness (Rsk) value is greater than 0 and increases, the distribution of peaks relative to a mean line increases. As a skewness (Rsk) value is less than 0 and decreases, the distribution of valleys relative to a mean line increases. According to the present invention, when a skewness (Rsk) is adjusted within a predetermined range, a product with a surface exhibiting a rough feeling without a plastic feel may be implemented.

BEST MODE

Hereinafter, a thermoplastic resin composition and a molded article including the same according to the present invention will be described in detail.

The present inventors confirmed that, when two types of acrylate-aromatic vinyl compound-vinyl cyanide compound graft copolymers each containing rubber particles having different average particle diameters were mixed in a predetermined ratio, a predetermined high molecular weight aromatic vinyl polymer excluding a heat-resistant aromatic vinyl polymer and a predetermined low molecular weight aromatic vinyl polymer were added thereto within a predetermined content range, and the pressure gradient or discharge rate of a thermoplastic resin composition applied to an extruder was adjusted to a predetermined value, no surface defects, such as flow marks or peeling, occurred at a low temperature of less than 200° C. even during co-extrusion with a PVC resin, energy consumption was reduced, and heat resistance was excellent. Based on these results, the present inventors conducted further studies to complete the present invention.

The thermoplastic resin composition of the present invention includes 10 to 70% by weight of a graft copolymer (A) including an acrylate-aromatic vinyl compound-vinyl cyanide compound graft copolymer (A-1) containing acrylate rubber having an average particle diameter of 50 to 150 nm and an acrylate-aromatic vinyl compound-vinyl cyanide compound graft copolymer (A-2) containing acrylate rubber having an average particle diameter of 300 to 600 nm; and 30 to 90% by weight of a non-grafted copolymer (B) including a high molecular weight aromatic vinyl compound-vinyl cyanide compound copolymer (B-1) having a weight average molecular weight of 160,000 to 200,000 g/mol and a low molecular weight aromatic vinyl compound-vinyl cyanide compound copolymer (B-2) having a weight average molecular weight of 80,000 g/mol or more and less than 160,000 g/mol. In this case, when extrusion RPM is changed from 20 to 60 under conditions of a barrel temperature of 190° C. and a die temperature of 200° C., the pressure gradient of the thermoplastic resin composition applied to a single screw extruder for sheet molding is 130 or less. In this case, the present invention has an advantage of providing a thermoplastic resin composition that has excellent processability at a low temperature of less than 200° C. compared to conventional ASA resins and thus has no surface defects, such as flow marks or peeling, during co-extrusion with a PVC resin; has excellent economics due to low energy consumption and a low content of an ASA resin; and has excellent heat resistance, and a molded article including the thermoplastic resin composition.

In addition, the thermoplastic resin composition of the present invention includes 10 to 70% by weight of a graft copolymer (A) including an acrylate-aromatic vinyl compound-vinyl cyanide compound graft copolymer (A-1) containing acrylate rubber having an average particle diameter of 50 to 150 nm and an acrylate-aromatic vinyl compound-vinyl cyanide compound graft copolymer (A-2) containing acrylate rubber having an average particle diameter of 300 to 600 nm; and 30 to 90% by weight of a non-grafted copolymer (B) including a high molecular weight aromatic vinyl compound-vinyl cyanide compound copolymer (B-1) having a weight average molecular weight of 160,000 to 200,000 g/mol and a low molecular weight aromatic vinyl compound-vinyl cyanide compound copolymer (B-2) having a weight average molecular weight of 80,000 g/mol or more and less than 160,000 g/mol. In this case, when the thermoplastic resin composition is discharged through a T-die for 1 minute and 30 seconds under conditions of a barrel temperature of 190° C., a die temperature of 200° C., and an extrusion RPM of 50, a discharge rate calculated based on the discharge amount of the thermoplastic resin composition is 18 g/min or more. In the case of the thermoplastic resin composition of the present invention and a molded article including the same, compared to a conventional ASA resin, processability is excellent at a low temperature of less than 200° C., and thus no surface defects, such as flow marks or peeling, occur even during co-extrusion with a PVC resin. In addition, energy consumption is reduced. In addition, due to excellent processing stability, a PVC resin may be effectively covered without significant change in viscosity in a wide processing window. In addition, heat resistance is excellent.

In addition, the thermoplastic resin composition of the present invention includes 100 parts by weight of a base resin including 10 to 70% by weight of a graft copolymer (A) including an acrylate-aromatic vinyl compound-vinyl cyanide compound graft copolymer (A-1) containing acrylate rubber having an average particle diameter of 50 to 150 nm and an acrylate-aromatic vinyl compound-vinyl cyanide compound graft copolymer (A-2) containing acrylate rubber having an average particle diameter of 300 to 600 nm; and 30 to 90% by weight of a non-grafted copolymer (B) including a high molecular weight aromatic vinyl compound-vinyl cyanide compound copolymer (B-1) having a weight average molecular weight of 160,000 to 200,000 g/mol and a low molecular weight aromatic vinyl compound-vinyl cyanide compound copolymer (B-2) having a weight average molecular weight of 80,000 g/mol or more and less than 160,000 g/mol, 0.1 to 10 parts by weight of a polyamide resin, and 0.1 to 5 parts by weight of an inorganic pigment. In the case of the thermoplastic resin composition of the present invention and a molded article including the same, compared to a conventional ASA resin, processability is excellent at a low temperature of less than 200° C., and thus no surface defects, such as flow marks or peeling, occur even during co-extrusion with a PVC resin. In addition, due to excellent processing stability, a PVC resin may be effectively covered without significant change in viscosity in a wide processing window. In addition, heat resistance is excellent.

In this specification, unless defined otherwise, molding temperature means the highest temperature among temperatures set in the temperature control zone of a barrel in an extrusion or injection device (or extrusion or injection process). In general, molding temperature refers to the temperature of a zone adjacent to a die in a barrel.

In this specification, unless defined otherwise, barrel temperature means molding temperature, and a barrel part means a zone, the temperature of which is directly controlled by a heating device in a barrel. In general, a barrel part consists of a plurality of temperature control zones without being limited thereto. The temperature of the barrel part is sequentially set from a temperature control zone or the first temperature control zone adjacent to an inlet (hopper) for injecting a thermoplastic resin composition to a temperature control zone or the last temperature control zone adjacent to a die.

In this specification, unless defined otherwise, die temperature means temperature set in a die nozzle, i.e., the temperature of a die nozzle during extrusion or injection, and a die part means a zone, the temperature of which is directly controlled by a heat device in a die. In general, a die part consists of a plurality of temperature control zones without being limited thereto. The temperature of the die part is sequentially set from a temperature control zone or the first temperature control zone adjacent to a barrel to the last temperature control zone or a nozzle adjacent to a die.

Hereinafter, each component constituting the thermoplastic resin composition of the present invention will be described in detail.

(A-1) Acrylate-Aromatic Vinyl Compound-Vinyl Cyanide Compound Graft Copolymer

For example, the acrylate rubber of the graft copolymer (A-1) may have an average particle diameter of 50 to 150 nm, preferably 50 to 130 nm, more preferably 100 to 130 nm. Within this range, a finally prepared thermoplastic resin composition may have excellent impact strength and appearance.

In this specification, average particle diameter may be measured by dynamic light scattering, and specifically, may be measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000 to 5,000 times with distilled water, i.e., a sample is diluted appropriately so as not to deviate significantly from an intensity setpoint of 300 kHz and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 psec.

For example, based on a total weight of the thermoplastic resin composition, the graft copolymer (A-1) may be included in an amount of 5 to 30% by weight, preferably 10 to 25% by weight, more preferably 10 to 20% by weight. Within this range, processability may be excellent during co-extrusion, and mechanical properties such as impact strength, tensile strength, and elongation, appearance, and surface hardness may be excellent.

For example, the graft copolymer (A-1) may include to 60% by weight of acrylate rubber, 20 to 40% by weight of an aromatic vinyl compound, and 10 to 20% by weight of a vinyl cyanide compound. Within this range, appearance and surface hardness may be excellent.

As a preferred example, the graft copolymer (A-1) may include 45 to 55% by weight of acrylate rubber, 30 to 40% by weight of an aromatic vinyl compound, and 10 to 20% by weight of a vinyl cyanide compound. Within this range, appearance and surface hardness may be excellent.

In this description, a polymer including a certain compound means a polymer prepared by polymerizing the compound, and a unit in the polymer is derived from the compound.

For example, the graft copolymer (A-1) may be prepared by emulsion polymerization. In this case, appearance and surface hardness may be excellent.

For example, the acrylate constituting acrylate rubber may include one or more selected from the group consisting of alkyl acrylates containing an alkyl group having 2 to 8 carbon atoms, preferably an alkyl acrylate containing an alkyl group having 4 to 8 carbon atoms, more preferably butyl acrylate or ethylhexyl acrylate.

For example, the aromatic vinyl compound may include one or more selected from the group consisting of styrene, α-methylstyrene, m-methylstyrene, p-methylstyrene, and p-tert-butylstyrene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

Emulsion graft polymerization methods commonly practiced in the art to which the present invention pertains may be used as the emulsion polymerization method of the present invention without particular limitation.

(A-2) Acrylate-Aromatic Vinyl Compound-Vinyl Cyanide Compound Graft Copolymer

For example, the acrylate rubber of the graft copolymer (A-2) may have an average particle diameter of 300 to 600 nm, preferably 350 to 600 nm, more preferably 350 to 550 nm. Within this range, mechanical properties such as tensile strength, elongation, and impact strength may be excellent.

For example, based on a total weight of the thermoplastic resin composition, the graft copolymer (A-2) may be included in an amount of 15 to 35% by weight, preferably 20 to 30% by weight, more preferably 20 to 25% by weight. Within this range, processability may be excellent during co-extrusion, and mechanical properties such as impact strength, tensile strength, and elongation, appearance, and surface hardness may be excellent.

For example, the graft copolymer (A-2) may include 40 to 60% by weight of acrylate rubber, 25 to 45% by weight of an aromatic vinyl compound, and 10 to 20% by weight of a vinyl cyanide compound. Within this range, mechanical properties such as tensile strength, elongation, and impact strength may be excellent.

As a preferred example, the graft copolymer (A-1) may include 45 to 55% by weight of acrylate rubber, 30 to 40% by weight of an aromatic vinyl compound, and 10 to 20% by weight of a vinyl cyanide compound. Within this range, mechanical properties such as tensile strength, elongation, and impact strength may be excellent.

For example, the graft copolymer (A-2) may be prepared by emulsion polymerization. In this case, mechanical properties such as tensile strength, elongation, and impact strength may be excellent.

Emulsion graft polymerization methods commonly practiced in the art to which the present invention pertains may be used as the emulsion polymerization method of the present invention without particular limitation.

For example, the acrylate constituting acrylate rubber may include one or more selected from the group consisting of alkyl acrylates containing an alkyl group having 2 to 8 carbon atoms, preferably an alkyl acrylate containing an alkyl group having 4 to 8 carbon atoms, more preferably butyl acrylate or ethylhexyl acrylate.

For example, the aromatic vinyl compound may include one or more selected from the group consisting of styrene, α-methylstyrene, m-methylstyrene, p-methylstyrene, and p-tert-butylstyrene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

For example, the sum of the weights of the graft copolymer (A-1) and the graft copolymer (A-2) may be 10 to 70% by weight, preferably 20 to 50% by weight, more preferably 30 to 40% by weight. Within this range, low-temperature processability may be excellent, and thus appearance may be excellent.

The amount of the graft copolymer (A-1) is preferably less than that of the graft copolymer (A-2). Specifically, the weight ratio of the graft copolymer (A-1) to the graft copolymer (A-2) is preferably 1:1.2 to 1:2.5, more preferably 1:1.4 to 1:2.5, still more preferably 1:1.5 to 1:2. Within this range, low-temperature processability may be excellent, and thus appearance may be excellent.

In this specification, the weight ratio of A to B refers to the weight ratio of A:B.

(B-1) High Molecular Weight Aromatic Vinyl Compound-Vinyl Cyanide Compound Copolymer The high molecular weight aromatic vinyl compound-vinyl cyanide compound copolymer (B-1) of the present invention is preferably an aromatic vinyl compound-vinyl cyanide compound copolymer having a weight average molecular weight of 160,000 to 200,000 g/mol, more preferably an aromatic vinyl compound-vinyl cyanide compound copolymer having a weight average molecular weight of 160,000 to 190,000 g/mol, still more preferably an aromatic vinyl compound-vinyl cyanide compound copolymer having a weight average molecular weight of 160,000 to 180,000 g/mol, still more preferably an aromatic vinyl compound-vinyl cyanide compound copolymer having a weight average molecular weight of 160,000 to 170,000 g/mol. Within this range, mechanical strength, such as impact strength, and heat resistance may be excellent.

Based on a total weight of the acrylate-aromatic vinyl compound-vinyl cyanide compound graft copolymer (A) and the non-grafted copolymer (B), the high molecular weight aromatic vinyl compound-vinyl cyanide compound copolymer (B-1) is preferably included in an amount of 20 to 55% by weight, more preferably 25 to 50% by weight. In this case, heat resistance may be excellent without deterioration in low-temperature processability.

In this specification, weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. Specific measurement conditions are as follows: solvent: THF, column temperature: 40° C., flow rate: 0.3 ml/min, sample concentration: 20 mg/ml, injection amount: 5 µl, column model: 1×PLgel 10 µm MiniMix-B (250×4.6 mm)+1×PLgel 10 µm MiniMix-B (250×4.6 mm)+1×PLgel 10 µm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

For example, the high molecular weight aromatic vinyl compound-vinyl cyanide compound copolymer (B-1) may include 65 to 80% by weight of an aromatic vinyl compound and 20 to 35% by weight of a vinyl cyanide compound, preferably 67 to 80% by weight of an aromatic vinyl compound and 20 to 33% by weight of a vinyl cyanide compound, more preferably 70 to 75% by weight of an aromatic vinyl compound and 25 to 30% by weight of a vinyl cyanide compound. Within this range, mechanical strength and low-temperature processability may be excellent.

For example, the aromatic vinyl compound may include one or more selected from the group consisting of styrene, α-methylstyrene, m-methylstyrene, p-methylstyrene, and p-tert-butylstyrene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

For example, the high molecular weight aromatic vinyl polymer (B-1) may be prepared by suspension polymerization, emulsion polymerization, solution polymerization, or bulk polymerization, preferably bulk polymerization. In this case, heat resistance and fluidity may be excellent.

Suspension polymerization, emulsion polymerization, solution polymerization, and bulk polymerization commonly practiced in the art to which the present invention pertains may be used in the present invention without particular limitation.

(B-2) Low Molecular Weight Aromatic Vinyl Compound-Vinyl Cyanide Compound Copolymer The low molecular weight aromatic vinyl compound-vinyl cyanide compound copolymer (B-2) of the present invention may be an aromatic vinyl compound-vinyl cyanide compound copolymer having a weight average molecular weight of greater than 80,000 g/mol and less than 160,000 g/mol, and preferably includes one or more selected from the group consisting of an aromatic vinyl compound-vinyl cyanide compound copolymer (B-2a) having a weight average molecular weight of 80,000 to 110,000 g/mol, and an aromatic vinyl compound-vinyl cyanide compound copolymer (B-2c) having a weight average molecular weight of greater than 110,000 g/mol and less than 160,000 g/mol, more preferably an aromatic vinyl compound-vinyl cyanide compound copolymer (B-2a) having a weight average molecular weight of 80,000 to 110,000 g/mol or an aromatic vinyl compound-vinyl cyanide compound copolymer (B-2c) having a weight average molecular weight of greater than 110,000 g/mol and less than 160,000 g/mol. Within this range, due to excellent processability at a low temperature of less than 200° C., no surface defects, such as flow marks or peeling, occur even during co-extrusion with a PVC resin. In addition, energy consumption may be reduced, thereby improving economics.

Based on a total weight of the acrylate-aromatic vinyl compound-vinyl cyanide compound graft copolymer (A) and the non-grafted copolymer (B), the low molecular weight aromatic vinyl compound-vinyl cyanide compound copolymer (B-2) is preferably included in an amount of 5 to 30% by weight, more preferably 5 to 35% by weight. Within this range, chemical resistance, impact strength, tensile strength, and low-temperature processability may be excellent.

Based on a total weight of the acrylate-aromatic vinyl compound-vinyl cyanide compound graft copolymer (A) and the non-grafted copolymer (B), the aromatic vinyl compound-vinyl cyanide compound copolymer (B-2a) is preferably included in an amount of 10 to 30% by weight, more preferably 10 to 25% by weight, still more preferably to 20% by weight. Within this range, chemical resistance, impact strength, tensile strength, and low-temperature processability may be excellent.

Based on a total weight of the acrylate-aromatic vinyl compound-vinyl cyanide compound graft copolymer (A) and the non-grafted copolymer (B), the aromatic vinyl compound-vinyl cyanide compound copolymer (B-2b) is preferably included in amount of 10 to 30% by weight, more preferably 10 to 25% by weight, still more preferably 10 to 20% by weight. Within this range, chemical resistance, impact strength, tensile strength, and low-temperature processability may be excellent.

Based on a total weight of the acrylate-aromatic vinyl compound-vinyl cyanide compound graft copolymer (A) and the non-grafted copolymer (B), the aromatic vinyl compound-vinyl cyanide compound copolymer (B-2c) is preferably included in an amount of 10 to 40% by weight, more preferably 20 to 40% by weight, still more preferably 20 to 35% by weight. Within this range, chemical resistance, impact strength, tensile strength, and low-temperature processability may be excellent.

The low molecular weight aromatic vinyl compound-vinyl cyanide compound copolymer (B-2) preferably includes 65 to 80% by weight of an aromatic vinyl compound and 20 to 35% by weight of a vinyl cyanide compound, more preferably 67 to 80% by weight of an aromatic vinyl compound and 20 to % by weight of a vinyl cyanide compound, still more preferably 70 to 75% by weight of an aromatic vinyl compound and 25 to 30% by weight of a vinyl cyanide compound. Within this range, chemical resistance, impact strength, tensile strength, and processability may be excellent.

For example, the aromatic vinyl compound may include one or more selected from the group consisting of styrene, m-methylstyrene, p-methylstyrene, and p-tert-butylstyrene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

For example, the low molecular weight aromatic vinyl polymer (B-2) may be prepared by suspension polymerization, emulsion polymerization, solution polymerization, or bulk polymerization, preferably bulk polymerization. In this case, heat resistance and fluidity may be excellent.

Suspension polymerization, emulsion polymerization, solution polymerization, and bulk polymerization commonly practiced in the art to which the present invention pertains may be used in the present invention without particular limitation.

Based on a total weight of the acrylate-aromatic vinyl compound-vinyl cyanide compound graft copolymer (A) and the non-grafted copolymer (B), the non-grafted copolymer (B) is preferably included in an amount of 30 to 90% by weight, more preferably 40 to 80% by weight, still more preferably 50 to 70% by weight, still more preferably 50 to 60% by weight. Within this range, low-temperature processability and heat resistance may be excellent.

Polyamide Resin

Based on 100 parts by weight in total of the acrylate-aromatic vinyl compound-vinyl cyanide compound graft copolymer (A) and the non-grafted copolymer (B), the polyamide resin of the present invention is preferably included in an amount of 0.1 to 10 parts by weight, more preferably 1 to 10 parts by weight, still more preferably 3 to 9 parts by weight, most preferably 4 to 7 parts by weight. Within this range, matte properties may be excellent while maintaining mechanical properties and low-temperature processability.

The polyamide resin preferably has a relative viscosity (96% sulfuric acid solution) of 2.5 or less, as a specific example, 2.0 to 2.5, as a preferred example, 2.2 to 2.5. Within this range, matte properties may be excellent while maintaining mechanical properties, weather resistance, and processability.

In this specification, relative viscosity may be measured using an Ubbelohde viscometer by the ISO 307 sulfuric acid method. Specifically, 1 g of a specimen to be measured is dissolved in 100 ml of an aqueous sulfuric acid solution having a concentration of 96% by weight to prepare a solution, and relative viscosity is measured at 20° C. using the solution and using a Brookfield rotational viscometer.

As a specific example, the polyamide resin may include one or more selected from the group consisting of polyamide 6, polyamide 66 (PA 6.6), polyamide 46, polyamide LL, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, and polyamide 66/12/6I, preferably one or more selected from the group consisting of polyamide 6, polyamide 12, and polyamide 66, more preferably polyamide 66. In this case, matte properties may be excellent while maintaining mechanical properties, weather resistance, and processability.

Polymerization methods commonly practiced in the art to which the present invention pertains may be used as a method of preparing the polyamide resin without particular limitation, and commercially available polyamides may also be used when the commercially available polyamides follow the definition of the polyamide according to the invention.

Inorganic Pigment

Based on 100 parts by weight in total of the acrylate-aromatic vinyl compound-vinyl cyanide compound graft copolymer (A) and the non-grafted copolymer (B), the inorganic pigment of the present invention is preferably included in an amount of 0.1 to 5 parts by weight, more preferably 0.1 to 2 parts by weight, still more preferably 0.1 to 1 part by weight, still more preferably 0.3 to 0.8 parts by weight. Within this range, weather resistance and hiding power may be excellent.

For example, the inorganic pigment may include one or more selected from the group consisting of metal compounds including Ti, Pb, Fe, Cr, etc and carbon black. The metal compounds are preferably metal oxides or metal hydroxides. As a specific example, the inorganic pigment may include one or more selected from the group consisting of $TiO_2$ and zinc oxide as white inorganic pigments; carbon black and graphite as black inorganic pigments; IOR, cadmium red, and red lead ($Pb_3O_4$) as red inorganic pigments; chrome yellow, zinc chromate, and cadmium yellow as yellow inorganic pigments; and chrome green and zinc green as green inorganic pigments, and most preferably, is $TiO_2$, which is a white inorganic pigment.

Additives

The thermoplastic resin composition of the present invention preferably includes a lubricant, an antioxidant, and a UV stabilizer.

Based on 100 parts by weight in total of the acrylate-aromatic vinyl compound-vinyl cyanide compound graft copolymer (A) and the non-grafted copolymer (B), the lubricant is preferably included in an amount of 0.1 to 3 parts by weight, more preferably 0.3 to 1 part by weight, still more preferably 0.3 to 0.8 parts by weight. Within this range, a surface having a rough feeling may be implemented, and impact strength and fluidity may be excellent.

For example, the lubricant may include one or more selected from the group consisting of an ester-based lubricant, a metal salt-based lubricant, a carboxylic acid-based lubricant, a hydrocarbon-based lubricant, and an amide-based lubricant, preferably an amide-based lubricant, more preferably a stearamide-based lubricant, most preferably alkylene bis(stearamide) containing alkylene having 1 to 10 carbon atoms. In this case, a surface having a rough feeling may be implemented, and impact strength and fluidity may be excellent.

In this specification, the stearamide-based lubricant may include stearamide and a stearamide substituent in which one or more hydrogens thereof are substituted with other substituents.

Ester-based lubricants, metal salt-based lubricants, carboxylic acid-based lubricants, hydrocarbon-based lubricants, and amide-based lubricants commonly used in the art may be used in the present invention without particular limitation.

The antioxidant preferably includes one or more selected from the group consisting of a phenolic antioxidant and a phosphorus antioxidant, more preferably a mixture of a phenol-based antioxidant and a phosphorus-based antioxidant.

Based on 100 parts by weight in total of the acrylate-aromatic vinyl compound-vinyl cyanide compound graft copolymer (A) and the non-grafted copolymer (B), each of the phenolic antioxidant and the phosphorus antioxidant is preferably included in an amount of 0.1 to 2 parts by weight, more preferably 0.1 to 1 part by weight, still more preferably 0.2 to 0.6 parts by weight. Within this range, a surface having a rough feeling may be implemented, and an antioxidative effect may be excellent.

The phenol-based antioxidant preferably includes one or more selected from tetrakis[ethylene-3-(3,5-di-t-butyl-hydroxyphenyl)propionate] (IR-1010), octadecyl 3-(3,5-di-t-butyl-4-hydroxyphenyl)propionate (IR-1076), pentaerythritol tetrakis[3-(3,5-di-t-butyl-4-hydroxyphenyl)propionate], and 1,3,5-trimethyl-2,4,6-tris(3,5-di-t-butyl-4-hydroxybenzil)benzene, more preferably octadecyl 3-(3,5-di-t-butyl-4-hydroxyphenyl)propionate (IR-1076). In this case, a surface having a rough feeling may be implemented, and antioxidative effect may be excellent.

The phosphorus-based antioxidant preferably includes one or more selected from the group consisting of tris(2,4-di-tert-butylphenyl) phosphite, tris(nonylphenyl) phosphite (TNPP), and di-(2,4-di-tert-butylphenyl) pentaerythritol diphosphite, more preferably tris(2,4-di-tert-butylphenyl) phosphite. Within this range, a surface having a rough feeling may be implemented, and antioxidative effect may be excellent.

The UV stabilizer preferably includes one or more selected from the group consisting of a benzotriazole-based UV stabilizer and a HALS-based UV stabilizer, more preferably a mixture of a benzotriazole-based UV stabilizer and a HALS-based UV stabilizer.

Based on 100 parts by weight in total of the acrylate-aromatic vinyl compound-vinyl cyanide compound graft copolymer (A) and the non-grafted copolymer (B), the UV stabilizer preferably includes 0.1 to 2 parts by weight of a benzotriazole-based UV stabilizer and 0.1 to 2 parts by weight of a HALS-based UV stabilizer, more preferably 0.2 to 1 part by weight of a benzotriazole-based UV stabilizer and 0.2 to 1 part by weight of a HALS-based UV stabilizer, still more preferably 0.3 to 0.8 parts by weight of a benzotriazole-based UV stabilizer and 0.3 to 0.8 parts by weight of a HALS-based UV stabilizer. Within this range, a surface having a rough feeling may be implemented, and light resistance may be excellent.

For example, the benzotriazole-based UV stabilizer may be a hydroxybenzotriazole-based compound, preferably a 2-(2'-hydroxyphenyl)benzotriazole-based compound, and more preferably includes one or more selected from the group consisting of 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl-5-chlorobenzotriazole), 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxy-carbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol], and a transesterification product of 2-[3'-tert-butyl-5'-(2-methoxycarbonylethyl)-2'-hydroxyphenyl]-2H-benzotriazole and polyethyleneglycol. Within this range, a surface having a rough feeling may be implemented, and light resistance may be excellent.

The HALS-based UV stabilizer preferably includes one Or more selected from the group consisting of 1,1-bis(2,2,6,6-tetramethyl-4-piperidyl)succinate, bis(2,2,6,6-tetramethyl-4-piperidyl)sebacate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-N-butyl-3,5-di-tert-butyl-4-hydroxybenzilmalonate, a condensation product of 1-(2-hydroxyethyl)-2,2,6,6-tetramethyl-4-hydroxypiperidine and succinic acid, a linear Or cyclic condensation product of N,N'-bis(2,2,6,6-tetramethyl-4-piperidyl)hexamethylene diamine and 4-tert-octylamino-2,6-di-chloro-1,3,5-triazine, tris(2,2,6,6-tetramethyl-4-piperidyl)nitrilotriacetate, tetrakis(2,2,6,6-tetramethyl-4-piperidyl)-1,2,3,4-butane tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, a linear or cyclic condensation product of N,N'-bis(2,2,6,6-tetramethyl-4-piperidyl)hexamethylene diamine and 4-morpholino-2,6-dichloro-1,3,5-triazine, and a reaction product of 7,7,9,9-tetramethyl-2-cycloundecyl-1-oxa-3,8-diaza-4-oxospiro-[4,5]decane and epichlorohydrin, more preferably bis(2,2,6,6-tetramethyl-4-piperidyl)sebacate, 2-(2H-benzotriazole-2-yl)-4-(1,1,3,3-tetramethylbutyl)phenol, or a mixture thereof. Within this range, a surface having a rough feeling may be implemented, and light resistance may be excellent.

When necessary, based on 100 parts by weight in total of the acrylate-aromatic vinyl compound-vinyl cyanide compound graft copolymer (A) and the non-grafted copolymer (B), the thermoplastic resin composition of the present invention may further include 0.01 to 5 parts by weight, 0.05 to 3 parts by weight, 0.1 to 2 parts by weight, or 0.5 to 1 part by weight of one or more selected from the group consisting of a heat stabilizer, a dye, a pigment (excluding inorganic pigments), a colorant, a release agent, an antistatic agent, an antibacterial agent, a processing aid, a metal deactivator, a flame retardant, a smoke suppressant, an anti-dripping agent, an anti-friction agent, and an anti-wear agent. Within this range, required physical properties may be implemented without reducing the effect desired in the present invention.

Thermoplastic Resin Composition

In the case of the thermoplastic resin composition of the present invention, when extrusion RPM is changed from 20 to 60 under conditions of a barrel temperature of 190° C. and a die temperature of 200° C., the pressure gradient of the thermoplastic resin composition applied to a single screw extruder for sheet molding (type of die: T-die) is preferably 130 or less, more preferably 100 to 130, still more preferably 110 to 130. Within this range, since change in viscosity according to shearing is insignificant, processing stability may be excellent.

When the thermoplastic resin composition is discharged through a T-die having a single screw T-die extruder for 1 minute and 30 seconds under conditions of a barrel temperature of 190° C., a die temperature of 200° C., and an extrusion RPM of 50, a discharge rate calculated based on the discharge amount of the thermoplastic resin composition is preferably 18 g/min or more, more preferably 18 to 19.5 g/min, still more preferably 18 to 19.0 g/min. Within this range, processability and economics may be excellent.

The thermoplastic resin composition preferably has a capillary viscosity of 2,500 to 3,200 Pas, more preferably 2,600 to 3,100 Pas, still more preferably 2,700 to 3,000 Pas as measured at 190° C. in a shear range of 100/s. Within this range, processability and economics may be excellent.

The thermoplastic resin composition preferably has a storage modulus (geometry: 25 mm parallel plate) of 70,000 to 150,000 MPa, more preferably 80,000 to 140,000 MPa, still more preferably 90,000 to 130,000 MPa, as measured under conditions of a temperature of 190° C., a strain of 0.1%, and a frequency of 10 rad/s. Within this range, since adhesion to the surface of a PVC resin is increased, the surface of the PVC resin may be effectively covered by an ASA resin, layer separation may not occur, and processability may be excellent.

The thermoplastic resin composition preferably has a skewness Rsk (200° C.) of 0 to 0.5, more preferably 0 to 0.4, still more preferably 0 to 0.3, still more preferably 0.05 to 0.2, most preferably 0.08 to 0.15. Within this range, weather resistance may be excellent without deterioration in mechanical properties and processability, and a product having a luxurious appearance, i.e., a rough feeling, without an artificial plastic feel may be provided.

The thermoplastic resin composition preferably has a skewness Rsk (220° C.) of 0.65 to 1.35, more preferably 0.7 to 1.2, still more preferably 0.7 to 1.3, still more preferably 0.7 to 1.0, most preferably 0.74 to 0.9. Within this range, weather resistance may be excellent without deterioration in mechanical properties and processability, and a product having a luxurious appearance, i.e., a rough feeling, without an artificial plastic feel may be provided.

The thermoplastic resin composition preferably does not include a thermoplastic resin having a glass transition temperature of 125° C. or higher. More preferably, the thermoplastic resin composition does not include one or more selected from the group consisting of an alpha-methylstyrene-vinyl cyanide compound copolymer and a methacrylate-aromatic vinyl compound-vinyl cyanide compound copolymer. Still more preferably, the thermoplastic resin composition does not include both of an alpha-methylstyrene-vinyl cyanide compound copolymer and a methacrylate-aromatic vinyl compound-vinyl cyanide compound copolymer. In this case, low-temperature processability may not decrease at a temperature of less than 200° C.

In this specification, glass transition temperature (Tg) may be measured by a measurement method commonly used in the art to which the present invention pertains to. As a specific example, glass transition temperature (Tg) may be measured using a differential scanning calorimeter (DSC) according to ASTM D 3418.

In this specification, that a predetermined thermoplastic resin is not included means that the thermoplastic resin is not included at all, and also means that the thermoplastic resin is added in an amount that does not alter the effects of the thermoplastic resin composition of the present invention at all. As a specific example, the amount of the thermoplastic resin may be less than 3% by weight, less than 2% by weight, less than 1% by weight, less than 0.5% by weight, or less than 0.1% by weight. Specifically, in the case of a heat resistant SAN resin such as alpha-methylstyrene-acrylonitrile copolymers, viscosity is high at low temperature, and change in viscosity is significant according to RPM. Accordingly, when the heat resistant SAN resin is added to the thermoplastic resin composition of the present invention, viscosity increases under low temperature processing conditions, thus deteriorating low-temperature processability and narrowing a processing window, thereby degrading processing stability. Accordingly, as described above, the heat resistant SAN resin is preferably excluded from the thermoplastic resin composition of the present invention.

The thermoplastic resin composition is preferably a decking material. In this case, physical properties required for a decking material may be satisfied.

The thermoplastic resin composition preferably has a heat resistance of 80° C. or higher, more preferably 82° C. or higher, still more preferably 84° C. or higher, as a preferred example, 80 to 90° C., as a more preferred example, 82 to 90° C., as measured under a load of 18.6 kgf according to ASTM D648. Within this range, sufficient heat resistance may be secured, and low-temperature processability may be excellent at a temperature of less than 200° C.

The thermoplastic resin composition is preferably a matte thermoplastic resin composition having a film gloss of 15 or less as measured at 60° using a gloss meter VG7000. More preferably, the thermoplastic resin composition is a matte thermoplastic resin composition having a film gloss of 10 or less, still more preferably 8 or less. Within this range, matte properties and physical property balance may be excellent. Thus, the thermoplastic resin composition of the present invention may be referred to as a matte thermoplastic resin composition.

A method of preparing the thermoplastic resin composition of the present invention preferably includes extruding and kneading a thermoplastic resin composition at 220 to 280° C. using an extrusion kneader to prepare pellets, wherein the thermoplastic resin composition includes 10 to % by weight of a graft copolymer (A) including an acrylate-aromatic vinyl compound-vinyl cyanide compound graft copolymer (A-1) containing acrylate rubber having an average particle diameter of 50 to 150 nm and an acrylate-aromatic vinyl compound-vinyl cyanide compound graft copolymer (A-2) containing acrylate rubber having an average particle diameter of 300 to 600 nm; and 30 to 90% by weight of a non-grafted copolymer (B) including a high molecular weight aromatic vinyl compound-vinyl cyanide compound copolymer (B-1) having a weight average molecular weight of 160,000 to 200,000 g/mol and a low molecular weight aromatic vinyl compound-vinyl cyanide compound copolymer (B-2) having a weight average molecular weight of 80,000 g/mol or more and less than 160,000 g/mol, wherein, when extrusion RPM is changed from 20 to 60 under conditions of a barrel temperature of 190° C. and a die temperature of 200° C., a pressure gradient applied to a single screw extruder for sheet molding is 130 or less. In the case of the thermoplastic resin composition of the present invention, compared to a conventional ASA resin, processability is excellent at a low temperature of less than 200° C., and thus no surface defects, such as flow marks or peeling, occur even during co-extrusion with a PVC resin. In addition, energy consumption is reduced. In addition, a PVC resin may be effectively covered using a small amount of an ASA resin, and thus economics is excellent. In addition, heat resistance is excellent.

As a specific example, under the conditions of a barrel temperature of 190° C. and a die temperature of 200° C., the temperatures of the barrel part may be 50, 190, 190, and 190° C., and the temperatures of the die part may be 200, 200, and 200° C.

The method of preparing the thermoplastic resin composition shares all the technical characteristics of the thermoplastic resin composition described above, and thus repeated description thereof will be omitted.

The step of preparing pellets using an extrusion kneader is preferably performed at 220 to 290° C., more preferably 250 to 290° C., still more preferably 270 to 290° C. In this case, the temperature is the temperature of a cylinder.

Extrusion kneaders commonly used in the art to which the present invention pertains may be used without particular limitation, and a twin-screw extrusion kneader is preferably used.

<Molded Article>

A molded article of the present invention includes the thermoplastic resin composition of the present invention. In the case of the thermoplastic resin composition of the present invention, compared to a conventional ASA resin, processability is excellent at a low temperature of less than 200° C., and thus no surface defects, such as flow marks or peeling, occur even during co-extrusion with a PVC resin. In addition, energy consumption is reduced. In addition, a PVC resin may be effectively covered using a small amount of an ASA resin, and thus economics is excellent. In addition, heat resistance is excellent.

The molded article is preferably an exterior material, more preferably a co-extrusion-molded article or an injection-molded article, still more preferably an article manufactured by co-extrusion with a PVC resin, as a specific example, a siding material, a decking material, a roofing material, a sliding door material, or a window material, as the most preferred example, a decking material.

For example, the molded article may be manufactured by co-extruding the thermoplastic resin composition of the present invention at a molding temperature of less than 200° C., preferably a molding temperature of 180° C. or higher and less than 200° C., more preferably a molding temperature of 190 to 199° C. Within this range, no surface defects occur, and energy consumption is reduced, thereby improving economics.

As another example, the molded article may be manufactured by extruding or injecting the thermoplastic resin composition of the present invention at a molding temperature of 190 to 250° C., preferably 190 to 230° C., more preferably 190 to 220° C.

In describing the thermoplastic resin composition of the present invention, the method of preparing the same, and the molded article including the same, other conditions or equipment that are not explicitly described may be appropriately selected without particular limitation within the range commonly practiced in the art.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples 1 to 6 and Comparative Examples 1 to 5 below are as follows.

A-1) Graft copolymer: Butylacrylate-styrene-acrylonitrile copolymer (butylacrylate: 50% by weight, styrene: 35% by weight, and acrylonitrile: 15% by weight) containing acrylate rubber having an average particle diameter of 130 nm A-2) Graft copolymer: Butylacrylate-styrene-acrylonitrile copolymer (butylacrylate: 50% by weight, styrene: 35% by weight, and acrylonitrile: 15% by weight) containing acrylate rubber having an average particle diameter of 500 nm B-1) SAN resin prepared by bulk polymerization (95HCP, manufactured by LG Chemical Co., weight average molecular weight: 91,000 g/mol)

B-2) SAN resin prepared by bulk polymerization (92HR, manufactured by LG Chemical Co., weight average molecular weight: 130,000 g/mol)

B-3) SAN resin prepared by bulk polymerization (90HR, manufactured by LG Chemical Co., weight average molecular weight: 150,000 g/mol)

B-4) SAN resin prepared by bulk polymerization (97HC, manufactured by LG Chemical Co., weight average molecular weight: 170,000 g/mol)

B-5) Heat-resistant SAN resin prepared by bulk polymerization (200UH, manufactured by LG Chemical Co., weight average molecular weight: 90,000 g/mol)

D) Nylon 66

Examples 1 to 6 and Comparative Examples 1 to 5

As shown in Table 1 below, the components were added according to the contents. At this time, 0.5 parts by weight of EBS (manufactured by SUNKOO Co.) as a lubricant, 0.4 parts by weight of octadecyl 3-(3,5-di-tert-butyl-4-hydroxyphenyl)propanoate and 0.4 parts by weight of tris(2,4-di-tert-butylphenyl)phosphite) as antioxidants, 0.6 parts by weight of Tinuvin 329 (manufactured by BASF), which is a benzotriazole-based UV stabilizer, and 0.6 parts by weight of Tinuvin 770 (manufactured by BASF), which is a HALS-based UV stabilizer were added to each sample and mixed uniformly, and then the mixture was kneaded and extruded at 280° C. using a twin-screw extruder to prepare pellets. In addition, the pellets were used to prepare a sheet having a thickness of 0.15 T. At this time, the sheet was prepared using a single screw T-die extruder under conditions of barrel temperatures of 50, 190, 190, and 190° C. and die temperatures of 200, 200, and 200° C. The prepared sheet was used to measure gloss and surface roughness. In addition, the prepared pellets were injected at a molding temperature of 220° C. to prepare a specimen for measuring physical properties. Then, the tensile strength and impact strength of the specimen were measured.

Test Examples

The properties of the pellets, the sheets, and the specimens prepared in Examples 1 to 6 and Comparative Examples 1 to 5 were measured according to the following methods, and the results are shown in Table 1 below.

Heat resistance (° C.): Heat resistance was measured under a load of 18.6 kgf according to ASTM D648.

Gloss: Gloss was measured at 60° using a gloss meter VG7000.

Pressure gradient: When extrusion RPM was changed from 20 to 60 under conditions of barrel temperatures of 50, 190, 190, and 190° C. and die temperatures of 200, 200, and 200° C., the pressure of a thermoplastic resin composition applied to a single screw extruder for sheet molding (E20T, Collin Co.) was measured. When measuring pressure gradient, after increasing RPM to 60, a resin was allowed to flow until the temperature of an adaptor inside an extruder was stabilized, and when the temperature was stabilized, pressure displayed on the extruder was recorded. Since temperature affects the viscosity of the resin, data should be taken after confirming that the temperature is constant. In the same manner, the pressure was recorded while sequentially decreasing RPM to 20. A slope obtained by drawing a logarithmic trend line on the graph of the obtained pressure change with respect to RPM was used as a pressure gradient value.

Discharge rate: The discharge amount of a thermoplastic resin composition discharged through a T-die for 1 minute and 30 seconds under conditions of barrel temperatures of 50, 190, 190, and 190° C., die temperatures of 200, 200, and 200° C., and an extrusion RPM of 50 was measured. Discharge rate was calculated based on the measured discharge amount.

Capillary viscosity (Pas): Flow viscosity was measured using a capillary rheometer (RG-75, GOETTFERT Co.) at 190° C. in a shear range of 10/s to 2,000/s. At this time, for result analysis, data in a shear range of 100/s was used, and the sample was dried in an oven at 80° C. for 3 hours or more before analysis to remove the effect of moisture on viscosity.

Storage modulus (MPa): A strain-controlled rheometer (ARES-G2, TA Instrument Co.) was used. A geometry used for measurement at a measurement temperature of 190° C. was a 25 mm parallel plate. At this time, a strain of 0.1% and a frequency of 0.1 to 500 rad/s were used. For result analysis, storage modulus data of 10 rad/s was used.

Skewness (Rsk): Referring to FIG. 1, when skewness was measured, an optical profiler system (Nano View NV-2700, Nano System Co.) was used, and scanning was performed for a range of ±40 μm under conditions of a WSI Envelope mode and objective lens (20×)× ocular lens (1×). At this time, a sample was fixed flat on a stage, and measurement was performed for 5 points. For the measured values, an average value for 5 points was calculated using an equation for obtaining a root mean square deviation (Rq) shown in the upper image and an equation for obtaining skewness (Rsk) shown in the lower image.

Here, when skewness (Rsk, 200° C.) was measured, the prepared pellets were uniformly extruded to a thickness of 0.15 T through a 15 pi film extruder under conditions of barrel temperatures of 50, 190, 190, and 190° C. and die temperatures of 200, 200, and 200° C., and Rsk was measured according to the above-described method. When skewness (Rsk, 220° C.) was measured, the prepared pellets were uniformly extruded to a thickness of 0.15 T through a 15 pi film extruder under conditions of barrel temperatures of 50, 200, 210, and 210° C. and die temperatures of 220, 220, and 230° C., and Rsk was measured according to the above-described method.

TABLE 1

|  | Examples | | | | | | Comparative Examples | | | | |
|---|---|---|---|---|---|---|---|---|---|---|---|
| (Parts by weight) | 1 | 2 | 3 | 4 | 5 | 6 | 1 | 2 | 3 | 4 | 5 |
| A-1 | 13 | 13 | 13 | 13 | 15 | 17 | 25 | 13 | 13 | 13 | 13 |
| A-2 | 23 | 23 | 23 | 23 | 19 | 17 | 15 | 25 | 23 | 23 | 23 |
| B-1 |  | 15 | 25 |  |  |  |  |  | 58 |  |  |
| B-2 |  |  |  |  |  | 20 |  |  |  | 58 |  |
| B-3 | 20 |  |  | 30 | 20 |  |  | 41 |  |  | 58 |
| B-4 | 38 | 43 | 33 | 28 | 40 | 40 |  |  |  |  |  |
| B-5 |  |  |  |  |  |  | 54 | 15 |  |  |  |
| D | 6 | 6 | 6 | 6 | 6 | 6 | 6 | 6 | 6 | 6 | 6 |
| TiO$_2$ pigment | 0.6 | 0.6 | 0.6 | 0.5 | 0.5 | 0.6 | 0.6 | 0.6 | 0.6 | 0.6 | 0.6 |
| RPM 60 | 326 | 288 | 295 | 292 | 291 | 281 | 370 | 311 | 275 | 282 | 296 |
| 50 | 310 | 271 | 277 | 273 | 275 | 264 | 346 | 290 | 255 | 266 | 276 |
| 40 | 289 | 249 | 252 | 248 | 252 | 242 | 310 | 259 | 228 | 242 | 252 |
| 30 | 248 | 213 | 217 | 209 | 218 | 210 | 264 | 215 | 202 | 210 | 220 |
| 20 | 189 | 157 | 166 | 157 | 163 | 160 | 193 | 154 | 171 | 167 | 170 |
| Slope | 126.16 | 119.76 | 118.2 | 124.13 | 117.09 | 110.33 | 162.07 | 144.55 | 94.92 | 105.95 | 114.27 |
| Discharge rate (g/min) | 18.1 | 18.5 | 18.3 | 18.4 | 18.7 | 18.9 | 15.9 | 17.4 | 19.3 | 18.7 | 18.3 |
| Capillary viscosity (Pa · s) | 2837 | 2766 | 2799 | 2778 | 2613 | 2793 | 3338 | 2988 | 2587 | 2714 | 2799 |
| Storage modulus (MPa) | 125070 | 107017 | 113842 | 116711 | 107503 | 94342 | 131601 | 111484 | 74351 | 89648 | 100207 |
| HDT (° C.) | 84.2 | 84.6 | 82.3 | 82.7 | 84.9 | 84.2 | 89.7 | 92.9 | 72.2 | 75.4 | 77.3 |
| Skewness (Rsk, 200° C.) | 0.12 | 0.11 | 0.08 | 0.14 | 0.15 | 0.12 | 0.34 | 0.28 | 0.14 | 0.13 | 0.09 |
| Skewness (Rsk, 220° C.) | 0.79 | 0.9 | 0.88 | 0.84 | 0.74 | 0.78 | 0.91 | 0.95 | 0.81 | 0.88 | 0.85 |
| Gloss (60°) | 8.2 | 7.8 | 8 | 8.2 | 9.3 | 8.7 | 6.5 | 6.8 | 7.9 | 8.1 | 8.3 |

As shown in Table 1, compared to Comparative Examples 1 to 5 having partially different compositions, in the case of the thermoplastic resin compositions (Examples 1 to 6) according to the present invention, due to excellent processability even at a low barrel temperature of less than 200° C., no surface defects, such as flow marks or peeling, occur. In addition, energy consumption is reduced, and change in viscosity is insignificant according to change in extrusion RPM, thereby increasing processing stability. In addition, heat resistance is excellent. More specifically, in the case of Comparative Examples 1 and 2 using a heat-resistant SAN resin instead of the SAN resin according to the present invention, due to low discharge rate, processability is deteriorated and economics is reduced. In the case of Comparative Examples 3 to 5 having a difference only in the type of the low molecular weight SAN resin, heat resistance (HDT) is deteriorated.

The invention claimed is:
1. A thermoplastic resin composition, comprising:
from 10 to 70% by weight of a graft copolymer (A) comprising:
   (A-1) an aromatic vinyl compound-vinyl cyanide compound graft copolymer-containing acrylate rubber having an average particle diameter of from 50 to 150 nm; and
   (A-2) an aromatic vinyl compound-vinyl cyanide compound graft copolymer-containing acrylate rubber having an average particle diameter of from 300 to 600 nm; and
from 30 to 90% by weight of a non-grafted copolymer (B) comprising:
   a high molecular weight aromatic vinyl compound-vinyl cyanide compound copolymer (B-1) having a weight average molecular weight of from 160,000 to 200,000 g/mol; and
   a low molecular weight aromatic vinyl compound-vinyl cyanide compound copolymer (B-2) having a weight average molecular weight of 80,000 g/mol or more and less than 160,000 g/mol,
wherein the thermoplastic resin composition does not comprise a thermoplastic resin having a glass transition temperature of 125° C. or higher, and
wherein, when extrusion RPM is changed from 20 to 60 under conditions of a barrel temperature of 190° C. and a die temperature of 200° C., a pressure gradient of the thermoplastic resin composition applied to a single screw extruder for sheet molding is 130 or less.

2. The thermoplastic resin composition according to claim 1, wherein, when the thermoplastic resin composition is discharged through a T-die for 1 minute and 30 seconds under conditions of a barrel temperature of 190° C., a die temperature of 200° C., and an extrusion RPM of 50, a discharge rate calculated based on a discharge amount of the thermoplastic resin composition is 18 g/min or more.

3. The thermoplastic resin composition according to claim 1, wherein, based on 100 parts by weight in total of the graft copolymer (A) and the non-grafted copolymer (B), the thermoplastic resin composition comprises from 0.1 to 10 parts by weight of a polyamide resin.

4. The thermoplastic resin composition according to claim 1, wherein, based on 100 parts by weight in total of the graft copolymer (A) and the non-grafted copolymer (B), the thermoplastic resin composition comprises from 0.1 to 5 parts by weight of an inorganic pigment.

5. The thermoplastic resin composition according to claim 1, wherein the thermoplastic resin composition is a decking material.

6. The thermoplastic resin composition according to claim 1, wherein a weight ratio of the graft copolymer (A-1) to the graft copolymer (A-2) is from 1:1.2 to 1:2.5.

7. The thermoplastic resin composition according to claim 1, wherein the graft copolymer (A-1) comprises from 40 to 60% by weight of acrylate-based rubber, from 20 to 40% by weight of an aromatic vinyl compound, and from 10 to 20% by weight of a vinyl cyanide compound.

8. The thermoplastic resin composition according to claim 1, wherein the graft copolymer (A-2) comprises from 40 to 60% by weight of the acrylate rubber, from 25 to 45% by weight of an aromatic vinyl compound, and from 10 to 20% by weight of a vinyl cyanide compound.

9. The thermoplastic resin composition according to claim 1, wherein each of the high molecular weight aromatic vinyl compound-vinyl cyanide compound copolymer (B-1) and the low molecular weight aromatic vinyl compound-vinyl cyanide compound copolymer (B-2) comprises from 65 to 80% by weight of an aromatic vinyl compound and from 20 to 35% by weight of a vinyl cyanide compound.

10. The thermoplastic resin composition according to claim 1, wherein the low molecular weight aromatic vinyl compound-vinyl cyanide compound copolymer (B-2) comprises one or more selected from the group consisting of an aromatic vinyl compound-vinyl cyanide compound copolymer (B-2a) having a weight average molecular weight of from 80,000 to 110,000 g/mol, and an aromatic vinyl compound-vinyl cyanide compound copolymer (B-2c) having a weight average molecular weight of greater than 110,000 g/mol and less than 160,000 g/mol.

11. The thermoplastic resin composition according to claim 1, wherein the thermoplastic resin composition has a heat resistance of 80° C. or higher as measured under a load of 18.6 kgf according to ASTM D648.

12. The thermoplastic resin composition according to claim 1, wherein the thermoplastic resin composition has a capillary viscosity of from 2,500 to 3,200 Pa·s as measured at 190° C. in a shear range of 100/s.

13. The thermoplastic resin composition according to claim 1, wherein the thermoplastic resin composition has a storage modulus of from 70,000 to 150,000 MPa as measured using a 25 mm parallel plate under conditions of a temperature of 190° C., a strain of 0.1%, and a frequency of 10 rad/s.

14. The thermoplastic resin composition according to claim 1, wherein the thermoplastic resin composition has a skewness Rsk (200° C.) of from 0 to 0.5 and a skewness Rsk (220° C.) of from 0.65 to 1.35.

15. The thermoplastic resin composition according to claim 1, wherein the thermoplastic resin composition is a matte thermoplastic resin composition having a film gloss of 15 or less as measured at 60°.

16. A molded article, comprising the thermoplastic resin composition according to claim 1.

* * * * *